United States Patent Office 3,429,802
Patented Feb. 25, 1969

3,429,802
METHOD FOR PRODUCING A SOLVENT FOR EDIBLE OILS
Kenneth D. Uitti, Bensenville, Ill., assignor to Universal Oil Products Company, Des Plaines, Ill., a corporation of Delaware
No Drawing. Filed Dec. 16, 1966, Ser. No. 602,155
U.S. Cl. 208—87          3 Claims
Int. Cl. C10g 31/14, 23/00, 21/06

ABSTRACT OF THE DISCLOSURE

Method for producing an edible oil solvent which comprises subjecting a pretreated non-aromatic raffinate stream from a solvent extraction zone with hydrogen to produce a non-aromatic hydrocarbon product having from 6 to 9 carbon atoms per molecule and containing less than 1% aromatic hydrocarbons and less than 10 parts per million of solvent. The hydrotreated non-aromatic product is uniquely suitable for use as an edible oil solvent.

---

This invention relates to a separation method. It also relates to a method for separating aromatic hydrocarbons from non-aromatic hydrocarbons. It particularly relates to a method for producing a solvent for edible oils. It further relates to a method for purifying a contaminated raffinate stream from an extraction process using selective catalytic hydrogenation to produce a solvent for edible oils.

The art of separating aromatic and non-aromatic hydrocarbons is well known. Generally, these hydrocarbons are separated via liquid-liquid extraction process using a solvent which is selective for aromatic hydrocarbons under extraction conditions sufficient to produce an extract stream comprising solvent having aromatic hydrocarbons dissolved therein and a raffinate stream comprising non-aromatic hydrocarbons contaminated with solvent and aromatic hydrocarbons. The extract phase is then subsequently sent to distillation means for the further purification of the aromatic hydrocarbons and the recovery and/or reuse of the solvent in the extraction process. The raffinate stream is conventionally subjected to treatment to remove dissolved and entrained solvent therefrom since the solvent is expensive and to lose it from the process would be an exorbitant cost. The treatment of the raffinate stream in many respects is a secondary extraction operation wherein the contaminated raffinate is subjected to water wash treatment such that the water removes the dissolved and entrained solvent from the hydrocarbon phase. The water containing the solvent is then subsequently passed into the same distillation facilities for recovering the solvent from the aromatic extract in order to recover that source of solvent so that solvent losses from the process may be minimized. In any event the raffinate phase after this treatment such as by water washing still contains a significant quantity of solvent, e.g., more than 500 p.p.m., and also contains the residual aromatic hydrocarbons which were present in the raffinate stream to the extent, for example, from 1% to 4% by weight.

Therefore, it is an object of this invention to provide a method for separating aromatic hydrocarbons from non-aromatic hydrocarbons.

It is another object of this invention to provide a method for producing a solvent for edible oils in a facile and economical manner.

According to the present invention there is provided a method for separating aromatic hydrocarbons from non-aromatic hydrocarbons which comprises: (a) contacting a hydrocarbon feed mixture containing aromatic and non-aromatic hydrocarbons with a solvent selective for aromatic hydrocarbons under conditions sufficient to produce an extract stream comprising solvent having aromatic hydrocarbons dissolved therein and a raffinate stream comprising non-aromatic hydrocarbons contaminated with solvent and aromatic hydrocarbons; (b) recovering aromatic hydrocarbons in high purity from said extract stream; (c) treating said contaminated non-aromatic hydrocarbons to remove solvent therefrom; (d) subjecting treated non-aromatic hydrocarbons to catalytic hydrogenation in a conversion zone under conditions sufficient to convert aromatic hydrocarbons to naphthenic hydrocarbons; and (e) recovering non-aromatic hydrocarbons in high concentration substantially free of solvent and aromatic hydrocarbons.

An illustrative embodiment of this invention includes the use of a solvent which comprises sulfolane.

A particular embodiment of this invention provides a method for producing an edible oil solvent which comprises passing a hydrocarbon feed stock containing aromatic and non-aromatic hydrocarbons into an extraction zone maintained under aromatic extraction conditions including the presence of a solvent selective for aromatic hydrocarbons, withdrawing from said zone an extract phase comprising solvent having aromatic hydrocarbons dissolved therein, withdrawing from said zone a raffinate phase comprising a major proportion of non-aromatic hydrocarbons and a minor proportion of aromatic hydrocarbons, subjecting raffinate phase to catalytic hydrogenation in a conversion zone maintained under conditions sufficient to convert aromatic hydrocarbons to naphthenic hydrocarbons and recovering from the effluent of said conversion zone an edible oil solvent substantially free of aromatic hydrocarbons.

In the food processing industry it is known to extract oil from food materials, e.g., soya beans, by contacting the pulverized food material with a solvent such as hexane and then subsequently recovering the solvent from the oil by distillation means. The extracted oil is further purified for example by contacting with caustic soda to remove free fatty acids in order to produce an oil suitable for human consumption. Such a purified oil is commonly called "edible oil." As used in the context of this invention the term "edible oil" is intended to include the oil which is extracted or dissolved in the non-aromatic hydrocarbon solvent produced through the practice of this invention notwithstanding the fact that the oil so extracted may need further purification before it can in fact be used in the food processing industry.

It is believed that one of the requirements for a satisfactory edible oil is that it contains less than 1% by volume aromatic hydrocarbons, preferably from 0.05% to 0.5% by volume, and must also contain less than 10 parts per million of solvent, e.g., sulfolane, and preferably from 0.1 to 1.0 part per million. It is extremely difficult to produce such a purified nonaromatic hydrocarbon product via conventional or prior art processing schemes. The usual solvent for use in extracting edible oils is selected from the group consisting of acetone, benzene, carbon disulfide, various fluorinated solvents, hexane, and etc. The prior art commonly uses highly pure hexane as the solvent for the edible oil.

The solvent extraction operation for aromatic hydrocarbon separation is suitably conducted by introducing a benzene-containing feed stock into the lower portion of an elongated column where solvent is introduced into the upper portion thereof. The feed stock and solvent move countercurrently through the column wherein effective contact between the countercurrently moving phase is generally secured by distributing or contacting means such as trays, contacting mass, masses, distributing plates, perforated plates, rotating disks, and the like. Temperature and pressure conditions are maintained in the column by suitable means to secure the formation of an extract phase and a raffinate phase. The solvents used in the solvent extraction step have a preferential selectivity for the relatively more aromatic type constituents as compared to the relatively more paraffinic type constituents. Solvents which may be used are, for example, phenol, furfural, sulfurdioxide, cresol, aniline, nitrobenzene, sulfolane, the polyethylene glycols, and the like. Such solvents may be further modified with regard to selectivity and solvent power by the addition of inert solvents, for example, by the addition of water. Of these solvents, according to the present invention, sulfolane is preferred.

The preferred solvent is of the sulfolane type and possesses a five membered ring containing one atom of sulfur and 4 atoms of carbon with 2 oxygen atoms bonded to the sulfur atom of the ring. Generically, the sulfolane type solvents may be indicated as having the following structural formula:

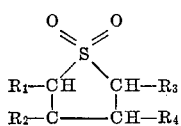

wherein $R_1$, $R_2$, $R_3$ and $R_4$ are independently selected from the group comprising a hydrogen atom, an alkyl group having from 1 to 10 carbon atoms, an alkoxy radical having from 1 to 8 carbon atoms, and an arylalkyl radical having from 1 to 12 carbon atoms. Other suitable solvents of the preferred type are the sulfolenes such as 2-sulfolene or 3-sulfolene. The distinctly preferred solvent sulfolane has the following structural formula:

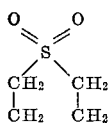

Because the typical solvents which are utilized in aromatic extraction are water soluble, it is the practice to extract the solvent from the raffinate stream by contact with an aqueous stream in a subsequent extraction means as previously mentioned. This extraction of the solvent from the raffinate with water may be undertaken in any suitable liquid-liquid contacting means and the solvent may be readily recovered from the aqueous solution by distillation. The raffinate now substantially free of solvent is further processed in accordance with the present invention. The hydrogenating operation of the present invention utilizes a catalyst which is well known to those skilled in the art for such reaction. Typically, the hydrogenation step is conducted with a high nickel content catalyst such as one containing about 65% nickel on kieselguhr. Group VIII metals in elementary forms or the oxides thereof may be used satisfactorily. As examples thereof, but not limited thereto, these metals include nickel, palladium, platinum, rhodium, etc. Specific examples include nickel on kieselguhr and platinum on alumina. Operating conditions for the hydrogenation step include a temperature from 400° F. to 900° F., preferably from 450° F. to 700° F., a pressure from 200 p.s.i.g. to 2000 p.s.i.g., preferably from 600 p.s.i.g. to 1000 p.s.i.g., a liquid hourly space velocity from 0.1 to 2.0, preferably from 0.05 to 1.0, and a hydrogen to hydrocarbon ratio from 200 to 20,000 standard cubic feet per barrel (s.c.f./b.), preferably from 300 to 10,000 s.c.f./b. In conjunction with the preferred operating conditions, it is distinctly preferred to utilize the catalyst which contains nickel as the hydrogenating component.

It has been found that the hydrogenating of the treated raffinate phase under the conditions described herein produces a non-aromatic hydrocarbon stream having from 6 to 9 carbon atoms per molecule containing less than 1% by volume aromatic hydrocarbons and less than 10 parts per million of solvent.

Thus, it can be seen from the description presented thus far that the present invention provides a method for separating aromatic from non-aromatic hydrocarbons while producing the non-aromatic hydrocarbons of such purity that they are suitable for use as a solvent for edible oils. Thus, referring now to the broad embodiment of the present invention as set forth hereinabove, a paraffinic raffinate stream containing sulfolane solvent in solution leaves an aromatics extraction zone at a temperature of from 150° F. to 250° F. and normally at a temperature of 200° F. to 210° F. The raffinate stream is then contacted with an aqueous stream and then cooled to about 100° F. or less wherein about two-thirds of the dissolved sulfolane leaves the hydrocarbon solution. The cooled stream then passes into an in-line mixer wherein the aqueous phase is intimately contacted with the hydrocarbon phase under conditions of sufficient turbulence and under sufficiently reduced ratio of hydrocarbon phase to non-hydrocarbon phase to provide a haze free raffinate hydrocarbon. The mixed stream of raffinate phase and sulfolane-containing aqueous phase enters an equeous extractor means wherein the raffinate is contacted with additional water derived either from fresh water or as stripping steam condensate from the aromatics extraction process unit. The conditioned raffinate is extracted in the extractor to produce a raffinate stream substantially free of sulfolane. The aqueous stream containing the extracted sulfolane leaves the extractor and is sent back into the aromatic process unit for recovery of the sulfolane solvent contained therein.

The treated raffinate stream now substantially free of sulfolane is passed into a hydrogenation zone in the presence of hydrogen and in contact with a nickel-containing catalyst. The conditions in the hydrogenation zone include a temperature of about 550° F., a pressure of about 700 p.s.i.g., and a liquid hourly space velocity of about 0.8. Hydrogen is mixed with the hydrocarbon phase at a rate of about 5,000 s.c.f./b. A raffinate stream comprising non-aromatic hydrocarbons substantially free of aromatic hydrocarbons and solvent is recovered. Such a product may contain about 0.1 volume percent aromatic hydrocarbons and about 0.5 p.p.m. of solvent.

I claim:
1. Method for producing an edible oil solvent which consists essentially of the following steps:
(a) passing a benzene-containing hydrocarbon feed stock comprising aromatic and non-aromatic hydrocarbons into a first extraction zone maintained under aromatic hydrocarbon extraction conditions including the presence of sulfolane-type primary solvent selective for aromatic hydrocarbons;
(b) withdrawing from said first extraction zone an extract stream comprising solvent having aromatic hydrocarbons, including benzene, dissolved therein, and a raffinate stream comprising non-aromatic hydrocarbons having from six to nine carbon atoms per molecule and contaminated with said solvent and with more than 1% by volume aromatic hydrocarbons;
(c) recovering benzene in high purity from said extract stream;
(d) introducing said contaminated raffinate stream into a second extraction zone maintained under conditions, including the presence of water as a secondary solvent, sufficient to remove a portion of said solvent-contaminant therefrom;
(e) withdrawing from said second extraction zone a raffinate stream comprising said non-aromatic hydrocarbons having reduced solvent-contaminant content, and a water stream containing said solvent-contaminant;
(f) introducing the raffinate stream from said second extraction zone into a catalytic hydrogenation zone maintained under conditions sufficient to remove from said raffinate contaminating quantities of primary solvent and convert aromatic hydrocarbons to naphthenes;

(g) recovering from said conversion zone nonaromatic hydrocarbons having from six to nine carbon atoms per molecule, containing less than 1% by volume aromatic hydrocarbons, and containing less than 10 p.p.m. of said primary solvent, suitable for use as an edible oil solvent.

2. Method according to claim 1 wherein said conversion conditions include a temperature from 450° F. to 700° F., a pressure from 600 p.s.i.g. to 1000 p.s.i.g., a liquid hourly space velocity from 0.05 to 1.0, and hydrogen to hydrocarbon ratio from 300 to 10,000 s.c.f./b.

3. Method according to claim 2 wherein said catalyst contains nickel.

References Cited

UNITED STATES PATENTS

| | | | |
|---|---|---|---|
| 2,627,495 | 2/1953 | Lanning | 208—87 |
| 2,967,147 | 1/1961 | Cole | 208—87 |
| 3,189,540 | 6/1965 | Kozlowski et al. | 208—89 |
| 3,308,059 | 3/1967 | Deal | 208—321 |
| 3,267,020 | 8/1966 | Wilson et al. | 208—15 |

FOREIGN PATENTS 870,474  6/1961  Great Britain.

HERBERT LEVINE, *Primary Examiner.*

U.S. Cl. X.R.

208—143, 325

UNITED STATES PATENT OFFICE
CERTIFICATE OF CORRECTION

Patent No. 3,429,802                              February 25, 1969

Kenneth D. Uitti

It is certified that error appears in the above identified patent and that said Letters Patent are hereby corrected as shown below:

Column 3, lines 34 to 39, the formula should appear as shown below:

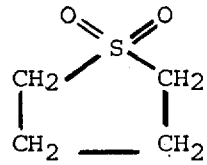

Signed and sealed this 31st day of March 1970.

(SEAL)
Attest:

Edward M. Fletcher, Jr.                        WILLIAM E. SCHUYLER, JR.

Attesting Officer                                      Commissioner of Patents